(12) United States Patent
Xiao et al.

(10) Patent No.: US 12,628,144 B2
(45) Date of Patent: May 12, 2026

(54) BANDWIDTH CONFIGURATION FOR NARROWBAND COMMUNICATIONS

(71) Applicant: ZTE Corporation, Shenzhen (CN)

(72) Inventors: Kai Xiao, Shenzhen (CN); Xing Liu, Shenzhen (CN); Jing Shi, Shenzhen (CN); Xianghui Han, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 299 days.

(21) Appl. No.: 18/534,018

(22) Filed: Dec. 8, 2023

(65) Prior Publication Data

US 2024/0188060 A1      Jun. 6, 2024

Related U.S. Application Data

(63) Continuation of application No. PCT/CN2022/075955, filed on Feb. 11, 2022.

(51) Int. Cl.
H04W 72/00      (2023.01)
H04L 5/00       (2006.01)
H04W 72/0453    (2023.01)

(52) U.S. Cl.
CPC ....... H04W 72/0453 (2013.01); H04L 5/0053 (2013.01)

(58) Field of Classification Search
None
See application file for complete search history.

(56) References Cited

U.S. PATENT DOCUMENTS

| | | | |
|---|---|---|---|
| 2016/0205671 A1 | 7/2016 | Tabet et al. | |
| 2018/0131487 A1 | 5/2018 | Ly et al. | |
| 2018/0220422 A1* | 8/2018 | Bhattad | H04L 5/0064 |
| 2019/0191453 A1 | 6/2019 | Xiong et al. | |

(Continued)

FOREIGN PATENT DOCUMENTS

| | | | | |
|---|---|---|---|---|
| CN | 120435906 A * | 8/2025 | ........... | H04L 5/0092 |
| WO | WO-2019031787 A1 * | 2/2019 | ......... | H04L 27/2649 |
| WO | WO-2023130296 A1 * | 7/2023 | ........... | H04L 5/0053 |

OTHER PUBLICATIONS

International Search Report and Written Opinion for International Application No. PCT/CN2022/075955, mailed on Nov. 11, 2022 (10 pages).

*Primary Examiner* — Brandon M Renner
(74) *Attorney, Agent, or Firm* — Perkins Coie

(57) ABSTRACT

Wireless communications techniques are disclosed, specifically for narrowband communication. One example method includes determining, by a network device, a first bandwidth for narrowband communication, wherein the first bandwidth is less than or equal to a default bandwidth. For example, the default bandwidth may be 5 MHz while narrowband communications operate over a smaller bandwidth, such as 3 or 3.6 MHz. The method further includes transmitting, to a wireless device, information indicative of the first bandwidth. In some implementations, determining the first bandwidth includes determining a starting location and a number of set of consecutive resource blocks, where the set of consecutive resource blocks are included in a control resource set for Type0 Physical Downlink Control Channel Common Search Space (CORESET 0) bandwidth or a Synchronization Signal Block (SSB) bandwidth.

12 Claims, 10 Drawing Sheets

200

Determine, by a network device, a first bandwidth for narrowband communication, wherein the first bandwidth is less than or equal to a default bandwidth.
202

Transmit, to a wireless device, information indicative of the first bandwidth.
204

(56)                    References Cited

U.S. PATENT DOCUMENTS

2019/0327718 A1 * 10/2019 Fang ..................... H04L 5/0044
2020/0099473 A1      3/2020 Han et al.
2021/0068075 A1      3/2021 Uesaka et al.
2021/0385826 A1 * 12/2021 Moon ................... H04W 72/23
2022/0240249 A1 *  7/2022 Liu ..................... H04W 56/001

* cited by examiner

200

Determine, by a network device, a first bandwidth for narrowband communication, wherein the first bandwidth is less than or equal to a default bandwidth.
202

Transmit, to a wireless device, information indicative of the first bandwidth.
204

Receive information indicative of a first bandwidth for narrowband communications.
302

Transmit a message in the first bandwidth.
304

300

Transmit, to a wireless device, an indicator to be used by the wireless device for decoding synchronization information.
402

Transmit, to the wireless device, the synchronization information.
404

400

500

Receive, from a network device, an indicator for decoding synchronization information.
502

Receive, from the network device, the synchronization information.
504

Decode the synchronization information based on the indicator.
506

Transmit configuration information to be used by a wireless device for reporting channel state information (CSI) in a first bandwidth.
602

Receive, from the wireless device, a CSI report based on the configuration information.
604

600

700

Receive, from a network device, configuration information for reporting channel state information (CSI) in a first bandwidth.
702

Transmit, to the network device, a CSI report in the first bandwidth based on the configuration information.
704

Configure a range for receiving uplink data from a wireless device, wherein a number of resources included in the range is greater than or equal to a number of PUSCH resources allocated to the wireless device.

802

Receive, from the wireless device, the uplink data within the range.

804

800

Receive, at a wireless device, information indicating a range for transmitting uplink data, wherein a number of resource included in the range is greater than or equal to a number of PUSCH resources allocated to a wireless device.
902

Transmit, to the network device, the uplink data within the range.
904

900

BANDWIDTH CONFIGURATION FOR NARROWBAND COMMUNICATIONS

CROSS-REFERENCE TO RELATED APPLICATIONS

This application is a continuation of International Patent Application No. PCT/CN2022/075955, filed on Feb. 11, 2022, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This document relates to methods, systems, and devices for bandwidth configuration in mobile communication technology, including 5th Generation (5G), new radio (NR), 4th Generation (4G), and long-term evolution (LTE) communication systems.

In one exemplary aspect, a wireless communication method is disclosed. The method includes determining, by a network device, a first bandwidth for narrowband communication, wherein the first bandwidth is less than or equal to a default bandwidth; and transmitting, to a wireless device, information indicative of the first bandwidth.

In another exemplary aspect, a wireless communication method is disclosed. The method includes receiving, by a wireless device, information indicative of a first bandwidth for narrowband communications; and transmitting, by the wireless device, a message in the first bandwidth.

In another exemplary aspect, a wireless communication method is disclosed. The method includes transmitting, to a wireless device, an indicator to be used by the wireless device for decoding synchronization information; and transmitting, to the wireless device, the synchronization information.

In another exemplary aspect, a wireless communication method is disclosed. The method includes receiving, from a network device, an indicator for decoding synchronization information; receiving, from the network device, the synchronization information; and decoding the synchronization information based on the indicator.

In another exemplary aspect, a wireless communication method is disclosed. The method includes transmitting, by a network device, configuration information to be used by a wireless device for reporting channel state information (CSI) in a first bandwidth; and receiving, from the wireless device, a CSI report based on the configuration information.

In another exemplary aspect, a wireless communication method is disclosed. The method includes receiving, from a network device, configuration information for reporting channel state information (CSI) in a first bandwidth; transmitting, to the network device, a CSI report in the first bandwidth based on the configuration information.

In another exemplary aspect, a wireless communication method is disclosed. The method includes configuring, by a network device, a range for receiving uplink data from a wireless device, wherein a number of resources included in the range is greater than or equal to a number of Physical Uplink Shared Channel (PUSCH) resources allocated to the wireless device; and receiving, from the wireless device, the uplink data within the range.

In another exemplary aspect, a wireless communication method is disclosed. The method includes receiving, from a network device, information indicating a range for transmitting uplink data, wherein a number of resources included in the range is greater than or equal to a number of Physical Uplink Shared Channel (PUSCH) resources allocated to a wireless device; and transmitting, to the network device, the uplink data within the range.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
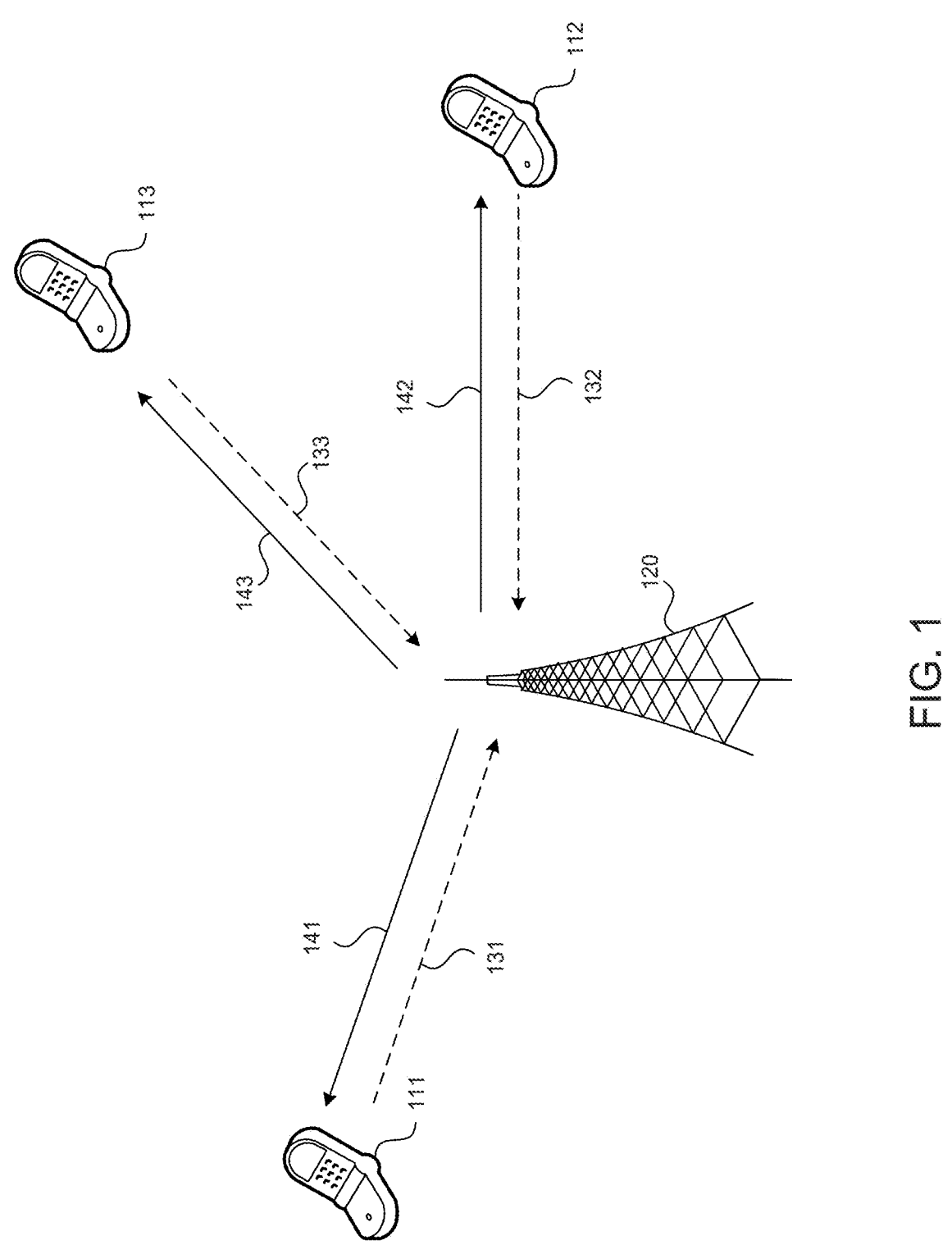
FIG. 1 shows an example of a wireless communication system that includes a base station (BS) and user equipment (UE).

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP NR network architecture and 5G protocol only to facilitate understanding and the disclosed techniques and embodiments may be practiced in other wireless systems that use different communication protocols than the 3GPP protocols.

Currently, in 5th Generation mobile communications systems, the supported minimum bandwidth is 5 MHz and the maximum number of the available resource blocks (RBs) is 24 when the subcarrier spacing (SCS) is 15 kHz. In some scenarios, such as railways, the available frequency domain resources of some operators may be less than 5 MHz. For example, NR narrowband is currently 3 or 3.6 MHz. An initial bandwidth part (BWP) configured by a gNodeB (gNB) for a UE is not less than 5 MHz. As a result, the RBs of the initial BWP may be punctured when the SCS is 15 kHz. In addition, if the initial BWP is not configured by the gNB for the UE, the bandwidth of the Control Resource Set (CORESET) for Type0 Physical Downlink Control Channel (PDCCH) Common Search Space (CORESET 0) is regarded as the initial BWP. However, the frequency domain resource of CORESET 0 comprises at least 24 RBs. Thus, when the defined minimum bandwidth is less than 5 MHz, such as 3.6 MHz, the number of available RBs is insufficient. As a result, the performance of the signals transmitted in the initial BWP is affected.

In addition, the minimum configurable subband size of a Channel State Information (CSI) report is currently 24 RBs. This subband configuration is insufficient to meet requirements of various scenarios relating to NR narrowband. According to current specifications, limited configurations are available in NR narrowband. Only a single Physical Random Access Channel (PRACH) occasion can be configured in NR narrowband because the available frequency domain resources are less than 24 RBs. If more PRACH occasions are needed for more flexible configurations, then the configuration must be extended.

Furthermore, except for some scenarios such as small bandwidth, changes in bandwidth can also have the above problems, such as full duplex.

As noted above, in the current 5G systems, the minimum bandwidth supported is 5 MHz. Frequency points are limited to 0-3000 MHz. Currently, the CORESET 0 BWP occupies at least 24 RBs in the frequency domain. The network configures an initial downlink BWP such that the initial downlink BWP contains the entire CORESET 0 in the frequency domain. If a UE is not provided an initial downlink BWP, the initial downlink BWP is defined by a location and a number of contiguous physical resource blocks (PRBs), starting from a PRB with a lowest index among PRBs of a CORESET 0 and ending at a PRB with a highest index among PRBs of the CORESET 0.

For CSI reporting, a UE can be configured via higher layer signaling with one out of two possible subband sizes, where the subband size depends on the total number of PRBs in the bandwidth part according to Table 1. The minimum BWP is 24 RBs.

4

TABLE 1

| Configurable subband sizes | |
| --- | --- |
| Bandwidth part (PRBs) | Subband size (PRBs) |
| 24-72 | 4, 8 |
| 73-144 | 8, 16 |
| 145-275 | 16, 32 |

According to current specifications, limited configurations are available in NR narrowband. Only a single Physical Random Access Channel (PRACH) occasion can be configured in NR narrowband because the available frequency domain resources are less than 24 RBs.

Embodiment 1

In some embodiments, a first bandwidth for a UE to receive downlink data or send uplink data is determined. The first bandwidth can be defined based on an actual BWP, such as an initial BWP, a Synchronization Signal/Physical Broadcast Channel (SS/PBCH) block bandwidth (BW), CORESET 0 BW, and so on.

In some narrowband scenarios, a supported minimum bandwidth is less than or equal to 5 MHz and the frequency point does not exceed 3 GHz. For example, 3.6 MHz or 3 MHz is supported in the 0-1 GHz frequency range. In these narrowband scenarios, a UE searches for SS/PBCH blocks according to at least one predefined frequency point. The SS/PBCH block includes at least four time-domain symbols, mapping at least one of Primary Synchronization Signal (PSS), Secondary Synchronization Signal (SSS), PBCH, or Demodulation Reference Signal (DMRS). The UE obtains Master Information Block (MIB) information by correctly decoding the signals in the SS/PBCH block. The UE receives downlink data or sends uplink data in the first bandwidth. All or part of the first bandwidth is in the minimum bandwidth.

In some embodiments, a portion of CORESET 0 RBs are punctured in the low or high frequency direction of the CORESET 0 bandwidth. Control Channel Elements (CCEs) can be remapped on all or part of the CORESET 0 bandwidth that is not punctured.

In some embodiments, a portion of CORESET 0 RBs are punctured in the low or high frequency direction of the CORESET 0 bandwidth. CCEs can be mapped all of the CORESET 0 bandwidth.

In some embodiments, a portion of SS/PBCH block RBs are punctured in the low or high frequency direction of the SS/PBCH block bandwidth.

At least one of the following methods can be used to determine the first bandwidth for a UE to receive downlink data or send uplink data.

Method 1: CCEs can be remapped on all or part of a CORESET 0 bandwidth that is not punctured. The first bandwidth can be defined by a location and number of contiguous PRBs, starting from a PRB with a lowest index and ending at a PRB with a highest index among PRBs of the frequency resources which CCEs are remapped on. Besides PRBs, a first bandwidth can be defined by various resource units, such as a resource element (RE), resource block (RB), or resource block group (RBG).

Method 2: The first bandwidth can be defined by a location and number of contiguous PRBs, starting from a PRB with a lowest index and ending at a PRB with a highest index among PRBs of the frequency resources of a CORESET 0 bandwidth which are not punctured. Besides PRBs, a first bandwidth can be defined by various resource units, such as a resource element (RE), resource block (RB), or resource block group (RBG).

Method 3: The first bandwidth can be defined by a location and number of contiguous PRBs, starting from a PRB with a lowest index and ending at a PRB with a highest index among PRBs of the frequency resources of an SS/PBCH block bandwidth which is not punctured. Besides PRBs, a first bandwidth can be defined by various resource units, such as a resource element (RE), resource block (RB), or resource block group (RBG).

Method 4: The first bandwidth can be defined by a location and number of contiguous PRBs, starting from a PRB with a lowest index and ending at a PRB with a highest index among PRBs of the frequency resource of an SS/PBCH block bandwidth. Besides PRBs, a first bandwidth can be defined by various resource units, such as a resource element (RE), resource block (RB), or resource block group (RBG).

Method 5: The first bandwidth can defined by at least one signaling carried by a MIB. The signaling includes at least one of the following information: a location of a starting PRB, a number of contiguous PRBs, a location of an ending PRB, an index corresponding to a location of a starting PRB and a number of contiguous PRBs, or an index corresponding to a location of a starting PRB and a location of an ending PRB. Besides PRBs, a first bandwidth can be defined by various resource units, such as a resource element (RE), resource block (RB), or resource block group (RBG).

In some embodiments, the first bandwidth can be used as a new signaling import protocol. In some embodiments, the first bandwidth can be one of the following: an initial downlink BWP, or an initial uplink BWP.

The techniques described above can be used to address the issues presented by the smaller bandwidth of NR narrowband by configuring a first bandwidth for downlink or uplink transmissions without modifying the initial BWP or CORESET 0 configurations.

Embodiment 2

Similar to Embodiment 1, a first bandwidth for a UE to receive downlink data or send uplink data can be determined. Also similarly, the first bandwidth described in this section can be used to address the issues presented by the smaller bandwidth of NR narrowband without modifying the initial BWP or CORESET 0 configurations. Notably, the first bandwidth can be directly configured relative to a CORE-SET 0 bandwidth without specifying an RB of the CORE-SET 0 bandwidth.

For example, in some narrowband scenarios, a supported minimum bandwidth is no more than 5 MHz and the frequency point does not exceed 3 GHz. For example, 3.6 MHz or/and 3 MHz is supported in the 0~1 GHz frequency range.

In some embodiments, a portion of CORESET 0 RBs are punctured in the low or high frequency direction of the CORESET 0 bandwidth. CCEs can remapped on all or part of the CORESET 0 bandwidth are is not punctured.

In some embodiments, a portion of CORESET 0 RBs are punctured in the low or high frequency direction of the CORESET 0 bandwidth. CCEs can be mapped all of the CORESET 0 bandwidth.

At least one of the following methods can be used to determine the first bandwidth for a UE to receive downlink data or send uplink data.

Method 1: The first bandwidth can be configured less than a CORESET 0 bandwidth. Subsequent transmissions are transmitted in the first bandwidth.

Method 2: The first bandwidth can be configured to include only a portion of the entire CORESET 0 bandwidth when the supported minimum bandwidth is less than or equal to 5 MHz. Subsequent transmissions are transmitted in the first bandwidth.

In some embodiments, the first bandwidth can be used as a new signaling import protocol. In some embodiments, the first bandwidth can be an initial downlink BWP or an initial uplink BWP.

Embodiment 3

Similar to Embodiments 1 and 2, a first bandwidth for a UE to receive downlink data or send uplink data can be determined. The first bandwidth can be determined based on a CORESET 0 bandwidth. Unlike embodiments 1 and 2, the CORESET 0 bandwidth can be configured to be different from a default value, such as 5 MHz.

In some narrowband scenarios, a supported minimum bandwidth is no more than 5 MHz and the frequency point does not exceed 3 GHz. For example, 3.6 MHz or 3 MHz is supported in the 0~1 GHz frequency range. In these narrowband scenarios, a UE searches for SS/PBCH blocks according to at least one frequency point defined by the specification. The SS/PBCH block includes at least four time domain symbols, mapping at least one of PSS, SSS, PBCH and DMRS. The UE obtains the MIB information by correctly decoding the signals in the SS/PBCH block. The UE receives downlink data or sends uplink data in the first bandwidth. All or part of the first bandwidth is in the minimum bandwidth.

At least one of the following methods can be used to determine the first bandwidth for a UE to receive downlink data or send uplink data.

Method 1: A CORESET 0 Bandwidth can be configured less than 5 MHz, such as 3.6 MHz, 3 MHz, 2.4 MHz, or 1.8 MHz. The first bandwidth can be defined by at least one signaling carried by the MIB. The signaling includes at least one of the following: a location of a starting PRB, a number of contiguous PRBs, a location of an ending PRB, an index corresponding to a location of a starting PRB and number of contiguous PRBs, or an index corresponding to a location of a starting PRB and a location of an ending PRB. Besides PRBs, a first bandwidth can be defined by various resource units, such as a resource element (RE), resource block (RB), or resource block group (RBG).

Method 2: The CORESET 0 Bandwidth can be configured less than 5 MHz, such as 3.6 MHz, 3 MHz, 2.4 MHz, or 1.8 MHz. The first bandwidth can be defined by at least one signaling carried by Radio Resource Control (RRC) signaling. The signaling includes at least one of the following: a location of a starting PRB, a number of contiguous PRBs, a location of an ending PRB, an index corresponding to a location of a starting PRB and number of contiguous PRBs, or an index corresponding to a location of a starting PRB and a location of an ending PRB. Besides PRBs, the first bandwidth can be defined by various resource units, such as a resource element (RE), resource block (RB), or resource block group (RBG).

Method 3: The CORESET 0 Bandwidth can be configured less than 5 MHz, such as 3.6 MHz, 3 MHz, 2.4 MHz, or 1.8 MHz. The first bandwidth can be defined by a location and number of contiguous PRBs, starting from a PRB with a lowest index and ending at a PRB with a highest index among PRBs of the CORESET 0 bandwidth. Besides PRBs, a first bandwidth can be defined by various resource units, such as a resource element (RE), resource block (RB), or resource block group (RBG).

Figure 2:
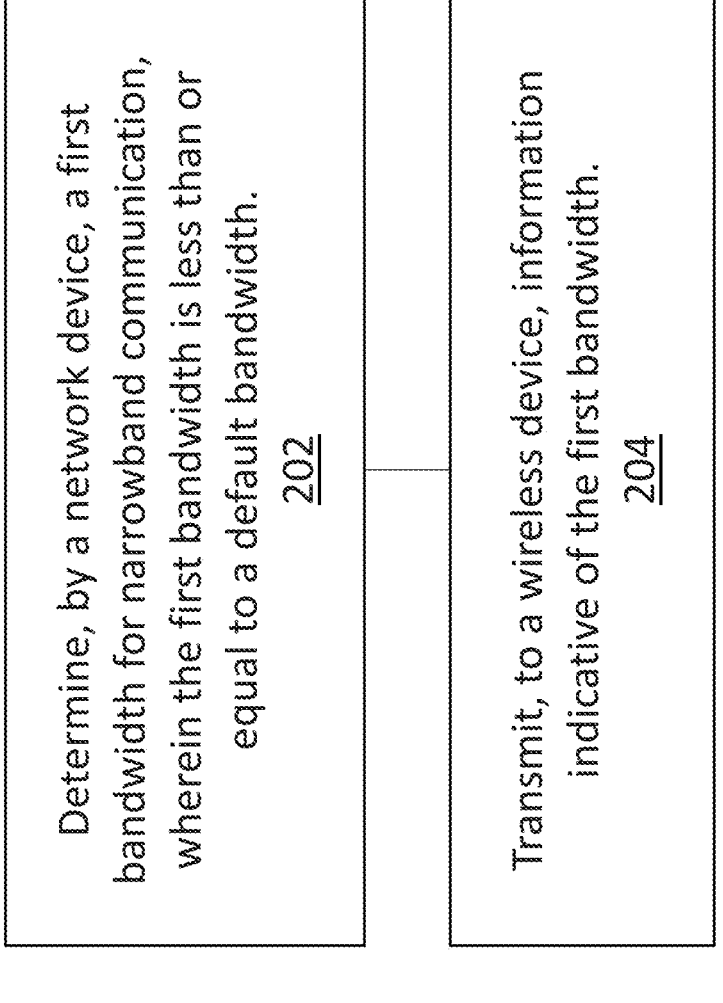
FIG. 2 is a flowchart illustrating an example method.

FIG. 2 is a flowchart illustrating an example method 200. For example, the method can be implemented by a network device. At 202, a first bandwidth is determined by a network device for narrowband communication, wherein the first bandwidth is less than or equal to a default bandwidth. For example, the default bandwidth can be an initial BWP of 5 MHz. In some embodiments, the first bandwidth is determined based on a location of a set of consecutive resource units and a number of consecutive resource units in the set, where the resource unit is a PRB. For example, the consecutive resource units can be included in a CORESET 0 bandwidth or SSB bandwidth. In some embodiments, a CORESET 0 bandwidth is configured to be less than or equal to the default bandwidth, and the first bandwidth is included in a CORESET 0 bandwidth.

At 204, information indicative of the first bandwidth is transmitted to a wireless device. For example, the information indicative of the first bandwidth can be carried a master information block (MIB) or radio resource control (RRC) signaling. The information at step 204 can include at least one of: a location of a starting resource unit, a location of an ending resource unit, a number of consecutive resource units, an index corresponding to the location of the starting resource unit and the number of consecutive resource units, or an index corresponding to the location of the starting resource unit and the location of the ending resource unit.

Figure 3:
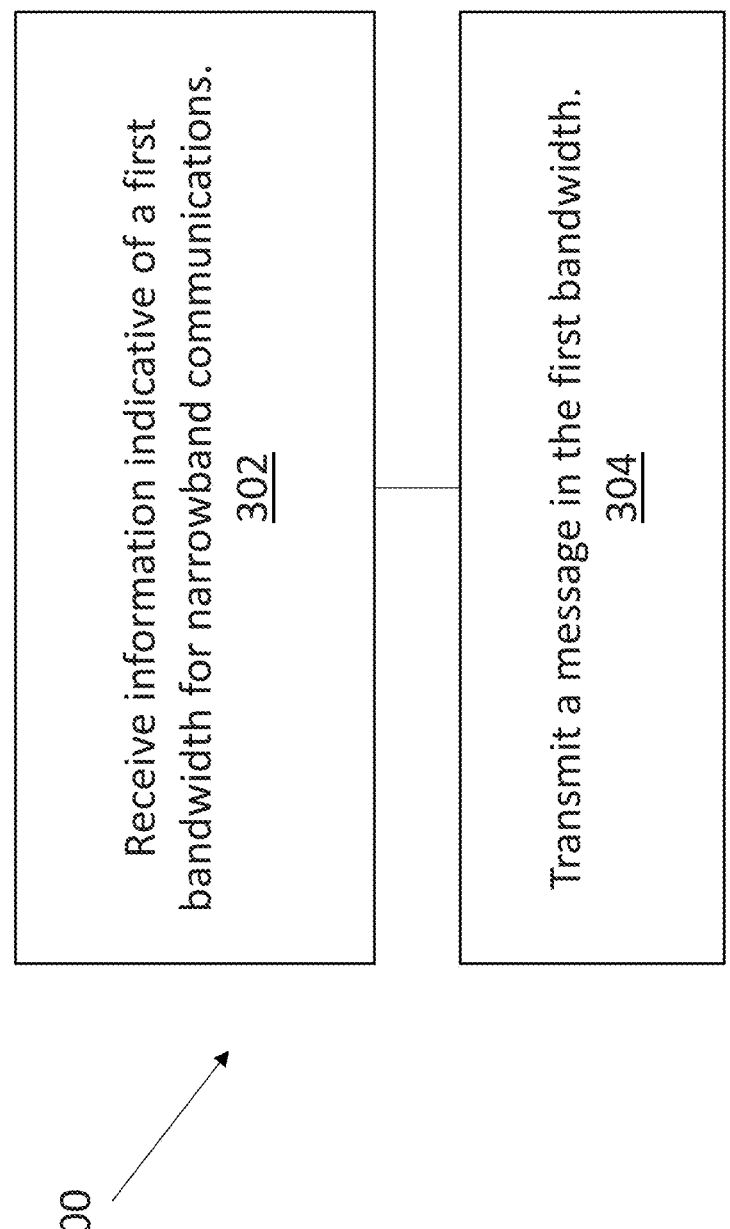
FIG. 3 is a flowchart illustrating an example method.

FIG. 3 is a flowchart illustrating an example method 300. For example, the method can be implemented by a wireless device. At 302, information indicative of a first bandwidth for narrowband communications is received. For example, the information indicative of the first bandwidth can be similar to the information determined at step 202 and transmitted at step 204 of FIG. 2. The information indicative of the first bandwidth can be carried a master information block (MIB) or radio resource control (RRC) signaling. The received information at 302 can include at least one of: a location of a starting resource unit, a location of an ending resource unit, a number of consecutive resource units, an index corresponding to the location of the starting resource unit and the number of consecutive resource units, or an index corresponding to the location of the starting resource unit and the location of the ending resource unit. At 304, a message is transmitted in the first bandwidth.

Embodiment 4

An indication field for a UE to receive downlink data or send uplink data can be determined. The indication field can be carried by a MIB, an RRC signal, or Downlink Control Information (DCI).

In some scenarios, there are at least two types of UEs in the network. Both types of UEs receive an SS/PBCH block from the same or part of the same synchronous raster. The first type of UE and the second type of UE differ in how they handle the signaling from the SS/PBCH block. For example, a first type of UE may not support a minimum bandwidth less than 5 MHz, while a second type of UE does support these narrower bandwidths. Therefore, additional signaling may be needed for all UEs to decode the necessary information.

In some embodiments, a first type of UE can receive SS/PBCH blocks, but the network prevents the first type of UE from decoding all or part of the information carried by the SS/PBCH block. In this case, an MIB can carry the UE information to be decoded.

In some embodiments, a first type of UE can receive SS/PBCH blocks, but the current specifications forbid the first type of UE from decoding all or part of the information carried by the SS/PBCH block. An MIB can carry the UE information to be decoded.

In some embodiments, a first type of UE can receive SS/PBCH blocks, but the network forbids the first type of UE from decoding all or part of the information carried by the SS/PBCH block. RRC signaling can carry the UE information to be decoded.

Figure 4:
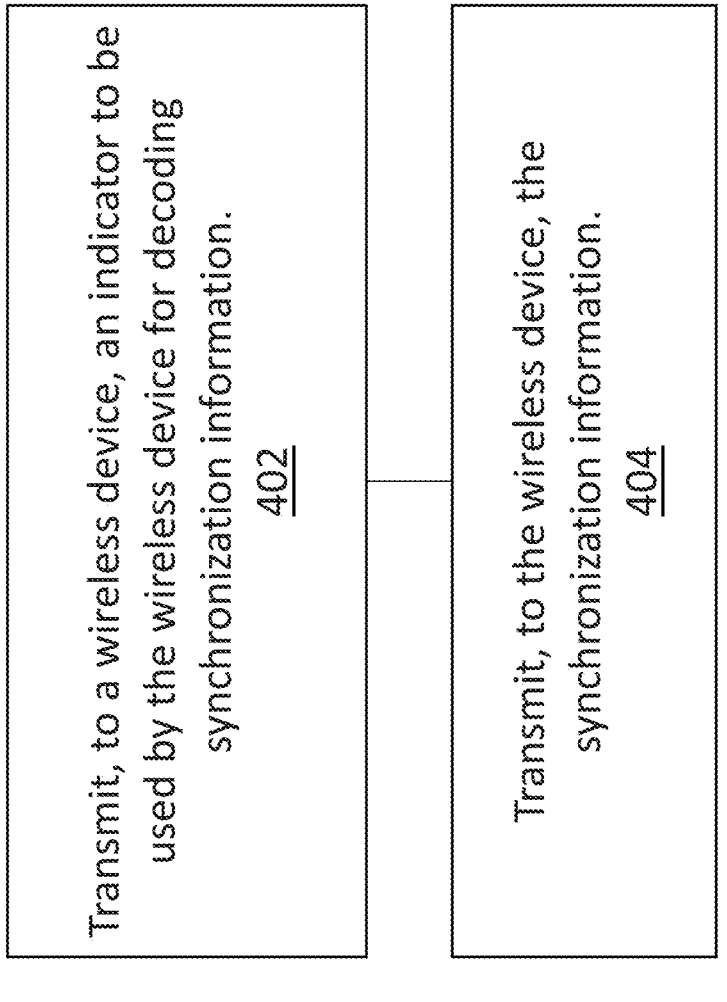
FIG. 4 is a flowchart illustrating an example method.

FIG. 4 is a flowchart illustrating an example method 400. For example, the method can be implemented by a network device for narrowband communications. At 402, an indicator to be used by a wireless device for decoding synchronization information is transmitted. For example, the indicator can be carried in a Master Information Block (MIB), a Radio Resource Control (RRC) signal, or Downlink Control Information (DCI). At 404, the synchronization information is transmitted.

Figure 5:
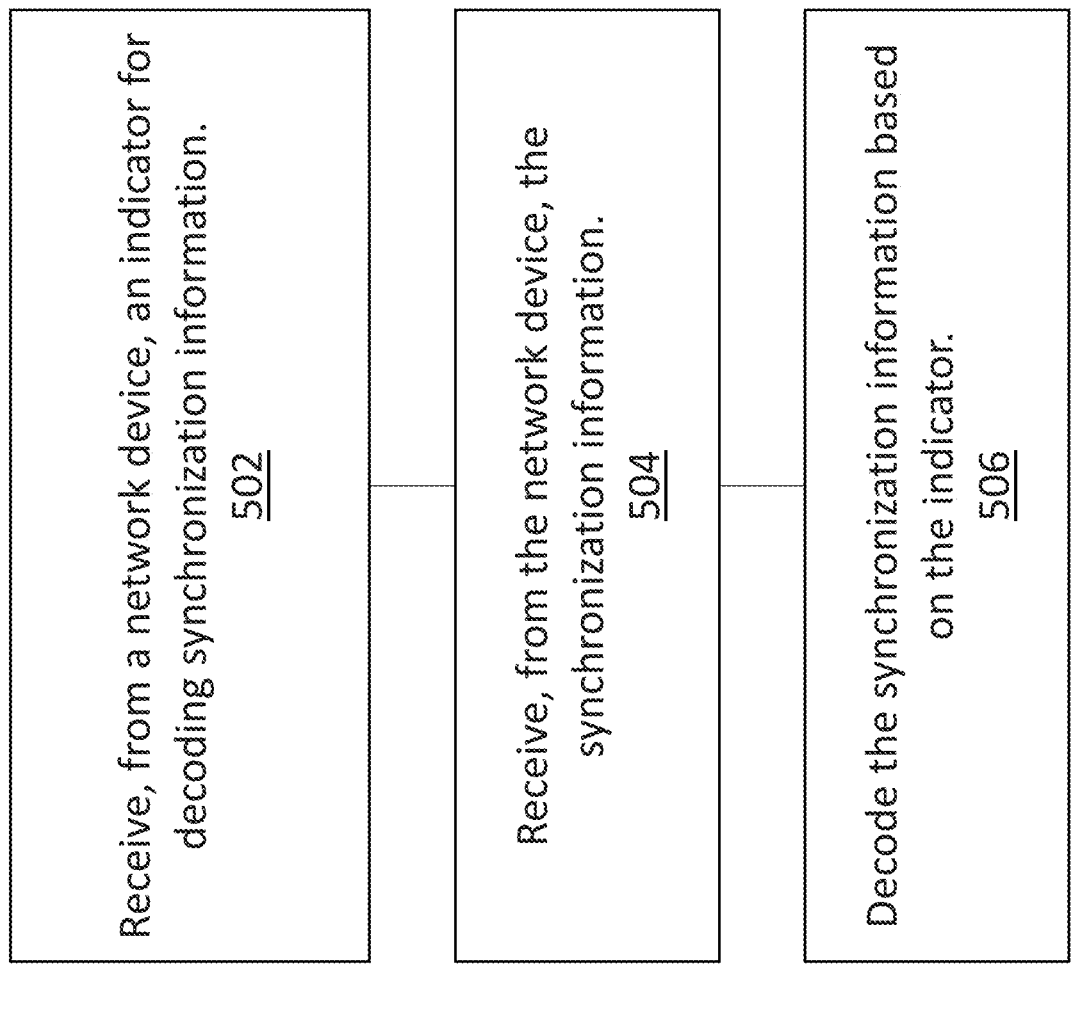
FIG. 5 is a flowchart illustrating an example method.

FIG. 5 is a flowchart illustrating an example method 500. For example, the method can be implemented by a wireless device for narrowband communications. At 502, an indicator for decoding synchronization information is received from a network device. For example, the indicator can be similar to the indicator transmitted at step 402 of FIG. 4. At 504, the synchronization information is received. For example, the synchronization information can be similar to the information transmitted at step 404 of FIG. 4. At 506, the synchronization information is decoded based on the indicator.

Embodiment 5

A CSI reporting method can be configured for narrowband scenarios. In some narrowband scenarios, a supported minimum bandwidth is less than or equal to 5 MHz and the frequency point does not exceed 3 GHz. For example, 3.6 MHz or 3 MHz is supported in the 0~1 GHz frequency range.

At least one of the following methods can be used to determine the CSI reporting method in a narrowband scenario.

Method 1: For CSI reporting, a UE can be configured via higher layer signaling with one out of two possible subband sizes, where a subband size depends on the total number of PRBs in the bandwidth part according to Table 1 or Table 2.

TABLE 1

| Configurable subband sizes | |
|---|---|
| Bandwidth part (PRBs) | Subband size (PRBs) |
| 4-23 | 2, 4 |
| 24-72 | 4, 8 |
| 73-144 | 8, 16 |
| 145-275 | 16, 32 |

TABLE 2

| Configurable subband sizes | |
| --- | --- |
| Bandwidth part (PRBs) | Subband size (PRBs) |
| 8-72 | 4, 8 |
| 73-144 | 8, 16 |
| 145-275 | 16, 32 |

Method 2: In some embodiments, for CSI reporting, only a BW feedback is supported in narrowband. The feedback BW can be configured by RRC signaling. For example, the feedback BW can be a downlink BW or an uplink BW for a UE.

Method 3: In some embodiments, for CSI reporting, only a BW feedback is supported in NR narrowband when an available bandwidth is less than a threshold value, such as 24 RBs. The feedback BW can be configured by RRC signaling. For example, the feedback BW can be a downlink BW or an uplink BW for a UE.

Figure 6:
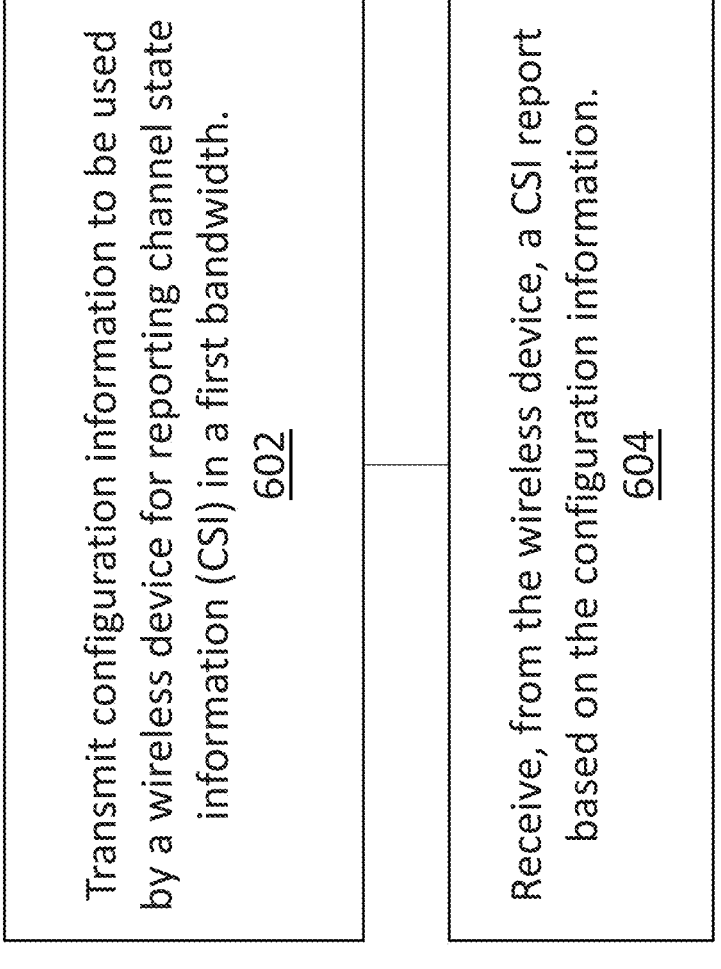
FIG. 6 is a flowchart illustrating an example method.

FIG. 6 is a flowchart illustrating an example method 600. For example, the method 600 can be implemented by a network device. At 602, configuration information to be used by a wireless device for reporting channel state information (CSI) in a first bandwidth is transmitted. In some embodiments, the configuration information is used to determine a subband size, where the subband size depends on a total number of physical resource blocks (PRBs) in a bandwidth part. In some embodiments, the configuration information is used to configure a feedback bandwidth, where the feedback bandwidth is a same size as the first bandwidth. At 604, a CSI report is received based on the configuration information.

Figure 7:
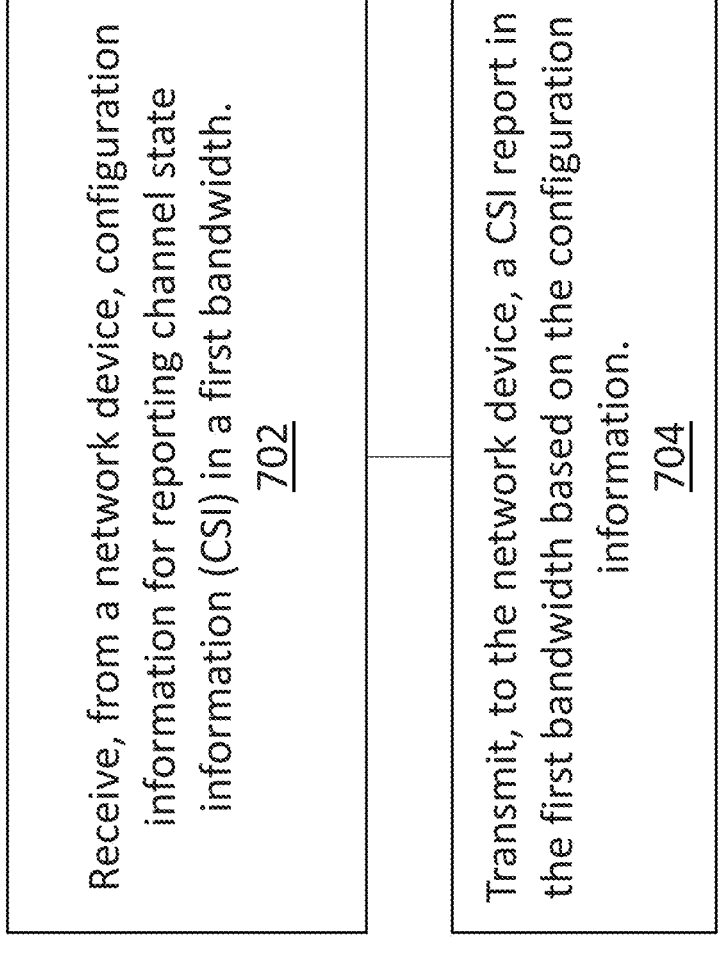
FIG. 7 is a flowchart illustrating an example method.

FIG. 7 is a flowchart illustrating an example method 700. For example, the method 700 can be implemented by a wireless device. At 702, configuration information for reporting channel state information (CSI) in a first bandwidth is received. For example, the configuration information can be similar to the configuration information transmitted at step 602. The configuration information can be used to determine a subband size, where the subband size depends on a total number of PRBs in a bandwidth part. The configuration information can also be used to configure a feedback bandwidth that is the same size as the first bandwidth. At 704, a CSI report is transmitted based on the configuration information.

Embodiment 6

A physical uplink shared channel (PUSCH) resource allocation method can be configured for narrowband scenarios. In some narrowband scenarios, a supported minimum bandwidth is less than or equal to 5 MHz and the frequency point does not exceed 3 GHz. For example, 3.6 MHz or 3 MHz is supported in the 0~1 GHz frequency range.

For example, when the number of PUSCH resources allocated to a UE is N, a flexible range comprising M resources can be configured for the UE by the gNB, where M and N are positive integers, and M is greater than or equal to N. The UE can send uplink data on any of M RBs within the flexible range.

Figure 8:
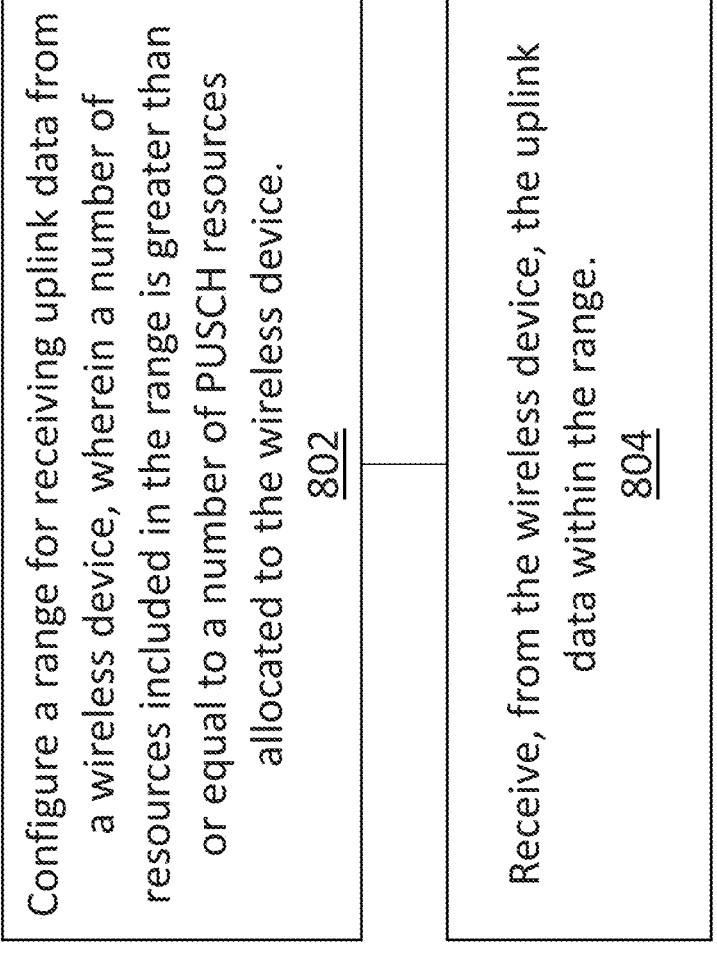
FIG. 8 is a flowchart illustrating an example method.

FIG. 8 is a flowchart illustrating an example method 800. For example, the method 800 can be implemented by a network device. At 802, a range for receiving uplink data from a wireless device is configured, where number of resources included in the range is greater than or equal to a number of PUSCH resources allocated to the wireless device. At 804, the uplink data is received from the wireless device within the configured range.

Figure 9:
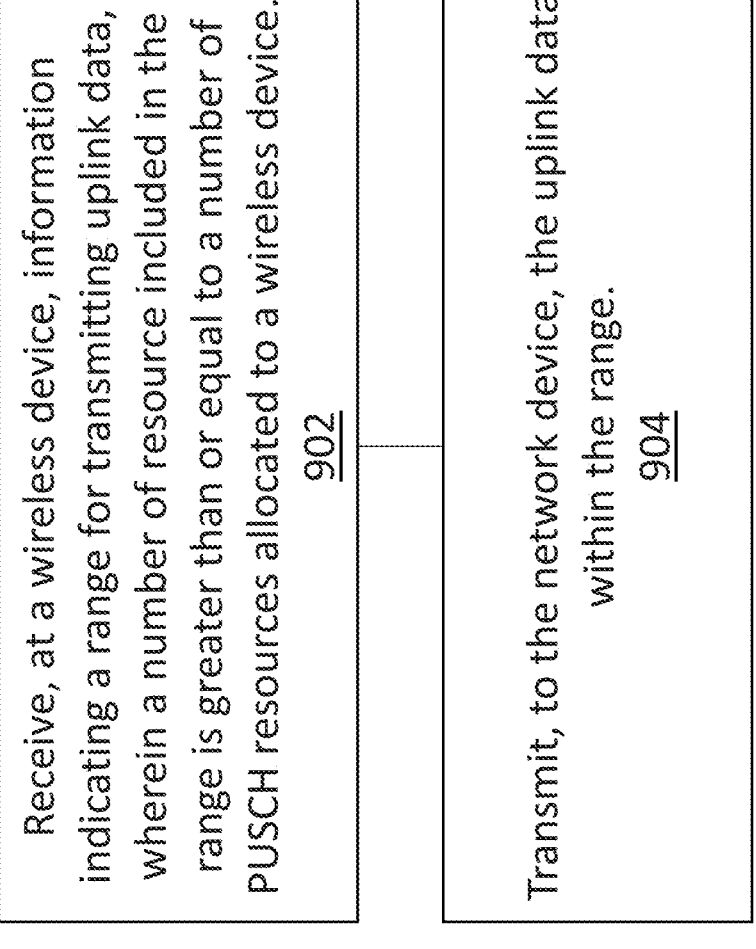
FIG. 9 is a flowchart illustrating an example method.

FIG. 9 is a flowchart illustrating an example method 900. For example, the method 900 can be implemented by a wireless device. At 902, information indicating a range for transmitting uplink data is received at a wireless device. The range includes a number of resources greater than or equal to a number of PUSCH resources allocated to the wireless device. At 904, the uplink data is transmitted within the indicated range.

Some embodiments may preferably incorporate the following solutions as described herein.

For example, the solutions listed below may be used by network device implementations (e.g., BS 120 of FIG. 1) for narrowband configuration as described herein.

1. A method (e.g., method 200 of FIG. 2) of wireless communication comprising: determining, by a network device, a first bandwidth for narrowband communication, wherein the first bandwidth is less than or equal to a default bandwidth (e.g., step 202 of FIG. 2); and transmitting, to a wireless device, information indicative of the first bandwidth (e.g., step 204 of FIG. 2).

2. The method of solution 1, wherein the default bandwidth is greater than or equal to 5 MHz.

3. The method of solution 1 or 2, wherein said determining the first bandwidth includes: determining a location of a set of consecutive resource units and a number of the set of consecutive resource units, wherein the set of consecutive resource units are included in a control resource set for Type0 Physical Downlink Control Channel Common Search Space (CORESET 0) bandwidth or a Synchronization Signal Block (SSB) bandwidth.

4. The method of any of solutions 1-3, wherein the resource units are physical resource blocks (PRBs), resource elements (REs), resource blocks (RBs), or resource block groups (RBGs).

5. The method of any of solutions 1-4, wherein at least a portion of the CORESET 0 bandwidth or the SSB bandwidth are punctured.

6. The method of any of solutions 1-5, wherein the lowest index and the highest index correspond to frequency resources of the CORESET 0 bandwidth, the method further comprising: remapping a plurality of control channel elements (CCEs) to a portion of the CORESET 0 bandwidth that is not punctured.

6a. The method of solution 6, wherein the frequency resources of the CORESET 0 bandwidth are not punctured.

7. The method of solution 1 or 2, wherein the first bandwidth is the default bandwidth.

8. The method of any of solutions 1-7, wherein the first bandwidth includes a portion of a CORESET #0 bandwidth or a SSB bandwidth.

9. The method of solution 1, wherein said determining the first bandwidth includes: configuring the first bandwidth to exclude a CORESET 0 bandwidth.

10. The method of solution 1 or 9, further comprising: configuring a CORESET 0 bandwidth to be smaller than the default bandwidth.

11. The method of solution 1, 9, or 10, wherein said determining the first bandwidth includes: determining a location of a set of consecutive resource units and a number of the set of consecutive resource units, wherein the set of consecutive resource units are included in the CORESET 0 bandwidth.

12. The method of any of solutions 1 or 9-11, wherein the information indicative of the first bandwidth is carried by a master information block (MIB) or radio resource control (RRC) signaling.

13. The method of any of solutions 1 or 9-12, wherein the information indicative of the first bandwidth includes at least one of: a location of a starting resource unit, a location of an ending resource unit, a number of consecutive resource units, an index corresponding to the location of the starting resource unit and the number of consecutive resource units, or an index corresponding to the location of the starting resource unit and the location of the ending resource unit.

For example, the solutions listed below may be used by network device implementations (e.g., BS 120 of FIG. 1) for handling synchronization signals as described herein.

14. A method of wireless communication (e.g., method 400 of FIG. 3) comprising: transmitting, to a wireless device, an indicator to be used by the wireless device for decoding synchronization information (e.g., step 402 of FIG. 4); and transmitting, to the wireless device, the synchronization information (e.g., step 404 of FIG. 4).

15. The method of solution 14, wherein the indicator is carried in a Master Information Block (MIB), a Radio Resource Control (RRC) signal, or Downlink Control Information (DCI).

For example, the solutions listed below may be used by network device implementations (e.g., BS 120 of FIG. 1) for reporting channel state information as described herein.

16. A method of wireless communication (e.g., method 600 of FIG. 6) comprising: transmitting, by a network device, configuration information to be used by a wireless device for reporting channel state information (CSI) in a first bandwidth (e.g., step 602 of FIG. 6); and receiving, from the wireless device, a CSI report based on the configuration information (e.g., step 604 of FIG. 6).

17. The method of solution 16, wherein the configuration information is used to determine a subband size, and wherein the subband size depends on a total number of physical resource blocks (PRBs) in a bandwidth part.

18. The method of solution 16 or 17, wherein the configuration information is used to configure a feedback bandwidth, and wherein the feedback bandwidth is a same size as the first bandwidth.

For example, the solutions listed below may be used by network device implementations (e.g., BS 120 of FIG. 1) for allocating Physical Uplink Shared Channel (PUSCH) resources as described herein.

19. A method of wireless communication (e.g., method 800 of FIG. 8) comprising: configuring, by a network device, a range for receiving uplink data from a wireless device, wherein a number of resources included in the range is greater than or equal to a number of Physical Uplink Shared Channel (PUSCH) resources allocated to the wireless device (e.g., step 802 of FIG. 8); and receiving, from the wireless device, the uplink data within the range (e.g., step 804 of FIG. 8).

For example, the solutions listed below may be used by wireless device implementations (e.g., UE 111, 112, or 113 of FIG. 1) for narrowband configuration as described herein.

20. A method (e.g., method 300 of FIG. 3) of wireless communication comprising: receiving, by a wireless device, information indicative of a first bandwidth for narrowband communications (e.g., step 302 of FIG. 3);

and transmitting, by the wireless device, a message in the first bandwidth (e.g., step 304 of FIG. 3).

21. The method of solution 20, wherein the default bandwidth is greater than or equal to 5 MHz.

22. The method of solution 20 or 21, wherein the information indicative of the first bandwidth includes: a location of a set of consecutive resource units and a number of the set of consecutive resource units, wherein the set of consecutive resource units are included in a control resource set for Type0 Physical Downlink Control Channel Common Search Space (CORESET 0) bandwidth or a Synchronization Signal Block (SSB) bandwidth.

23. The method of any of solutions 20-22, wherein the resource units are physical resource blocks (PRBs), resource elements (REs), resource blocks (RBs), or resource block groups (RBGs).

24. The method of any of solutions 20-23, wherein at least a portion of the CORESET 0 bandwidth or the SSB bandwidth are punctured.

25. The method of any of solutions 20-24, wherein the lowest index and the highest index correspond to frequency resources of the CORESET 0 bandwidth, and wherein a plurality of control channel elements (CCEs) to a portion of the CORESET 0 bandwidth that is not punctured.

25a. The method of solution 25, wherein the frequency resources of the CORESET 0 bandwidth are not punctured.

26. The method of solution 20 or 21, wherein the first bandwidth is the default minimum bandwidth.

27. The method of any of solutions 20-26, wherein the first bandwidth includes a portion of a CORESET #0 bandwidth or a SSB bandwidth.

28. The method of solution 20, wherein the information indicative of the first bandwidth includes a CORESET 0 bandwidth, and wherein the first bandwidth does not include the CORESET 0 bandwidth.

29. The method of solution 20 or 28, wherein the information indicative of the first bandwidth includes a CORESET 0 bandwidth, and wherein the CORESET 0 bandwidth is smaller than the default bandwidth.

30. The method of solution 20, 28, or 29, wherein the information indicative of the first bandwidth further includes a location of a set of consecutive resource units and a number of the set of consecutive resource units, wherein the set of consecutive resource units are included in the CORESET 0 bandwidth.

31. The method of any of solutions 20 or 28-30, wherein the information indicative of the first bandwidth is carried by a master information block (MIB) or radio resource control (RRC) signaling.

32. The method of any or solutions 20 or 28-31, wherein the information indicative of the first bandwidth includes at least one of: a location of a starting resource unit, a location of an ending resource unit, a number of consecutive resource units, an index corresponding to the location of the starting resource unit and the number of consecutive resource units, or an index corresponding to the location of the starting resource unit and the location of the ending resource unit.

For example, the solutions listed below may be used by wireless device implementations (e.g., UE 111, 112, or 113 of FIG. 1) for handling synchronization signals as described herein.

33. A method of wireless communication (e.g., method 500 of FIG. 5) comprising:

receiving, from a network device, an indicator for decoding synchronization information (e.g., step 502 of FIG. 5); receiving, from the network device, the synchronization information (e.g., step 504 of FIG. 5); and decoding the synchronization information based on the indicator (e.g., step 506 of FIG. 5).

34. The method of solution 33, wherein the indicator is carried in a Master Information Block (MIB), a Radio Resource Control (RRC) signal, or Downlink Control Information (DCI).

For example, the solutions listed below may be used by wireless device implementations (e.g., UE 111, 112, or 113 of FIG. 1) for reporting channel state information (CSI) as described herein.

35. A method of wireless communication (e.g., method 700 of FIG. 7) comprising:

receiving, from a network device, configuration information for reporting channel state information (CSI) in a first bandwidth (e.g., step 702 of FIG. 7); transmitting, to the network device, a CSI report in the first bandwidth based on the configuration information (e.g., step 704 of FIG. 7).

36. The method of solution 35, wherein the configuration information is used to determine a subband size, and wherein the subband size depends on a total number of physical resource blocks (PRBs) in a bandwidth part.

37. The method of solution 35 or 36, wherein the configuration information is used to configure a feedback bandwidth, and wherein the feedback bandwidth is a same size as the first bandwidth.

For example, the solutions listed below may be used by wireless device implementations (e.g., UE 111, 112, or 113 of FIG. 1) for allocating Physical Uplink Shared Channel (PUSCH) resources as described herein.

38. A method of wireless communication (e.g., method 900 of FIG. 9) comprising: receiving, from a network device, information indicating a range for transmitting uplink data, wherein a number of resources included in the range is greater than or equal to a number of Physical Uplink Shared Channel (PUSCH) resources allocated to a wireless device (e.g., step 902 of FIG. 9); and transmitting, to the network device, the uplink data within the range (e.g., step 904 of FIG. 9).

39. An apparatus for wireless communication comprising a processor configured to implement the method of any of solutions 1 to 38.

40. A computer readable medium having code stored thereon, the code when executed by a processor, causing the processor to implement a method recited in any of solutions 1 to 38.

Figure 10:
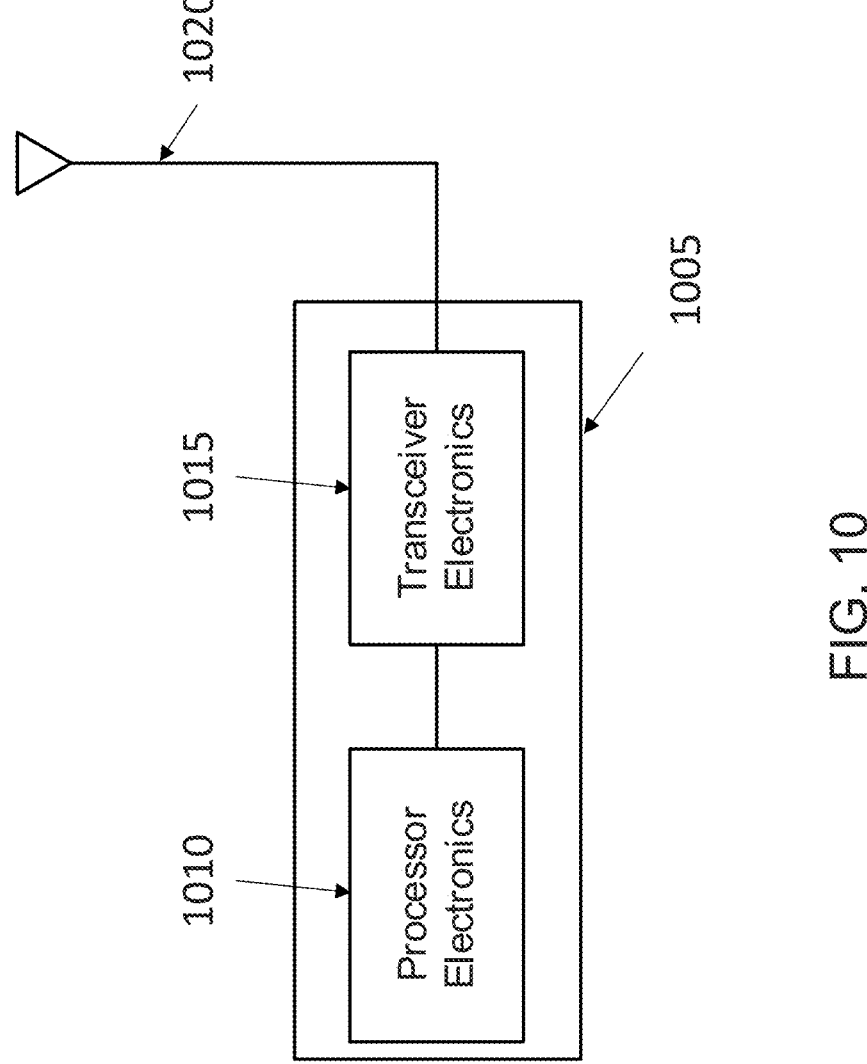
FIG. 10 is a block diagram representation of a portion of an apparatus that can be used to implement methods and/or techniques of the presently disclosed technology.

FIG. 10 is a block diagram representation of a portion of an apparatus, in accordance with some embodiments of the presently disclosed technology. An apparatus 1005 such as a network device or a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements, and variations can be made based on what is described and illustrated in this disclosure.

What is claimed is:

1. A method of wireless communication comprising:

determining, by a network device, a first bandwidth for a wireless device to perform narrowband communication, wherein the first bandwidth is less than or equal to a default bandwidth, wherein the default bandwidth is greater than or equal to 5 MHz, and wherein the first bandwidth is determined based on a location of a set of consecutive resource units and a number of resource units of the set of consecutive resource units; and transmitting, to the wireless device, information indicative of the first bandwidth;

wherein the set of consecutive resource units is included in a control resource set for a Type0 Physical Downlink Control Channel Common Search Space (CORESET 0) bandwidth or a Synchronization Signal Block (SSB) bandwidth; and wherein at least a portion of the CORESET 0 bandwidth or at least a portion the SSB bandwidth is punctured, and wherein the set of consecutive resource units corresponds to frequency resources of the CORESET 0 bandwidth that are not punctured.

2. The method of claim 1, further comprising:

configuring a CORESET 0 bandwidth to be smaller than the default bandwidth, wherein the set of consecutive resource units are included in the CORESET 0 bandwidth.

3. The method of claim 1, wherein the information indicative of the first bandwidth is carried by a master information block (MIB) or radio resource control (RRC) signaling, and wherein the information indicative of the first bandwidth includes at least one of:

a location of a starting resource unit of the set of consecutive resource units, a location of an ending resource unit of the set of consecutive resource units, the number of resource units, an index corresponding to the location of the starting resource unit and the number of resource units, or an index corresponding to the location of the starting resource unit and the location of the ending resource unit.

4. A method of wireless communication comprising:

receiving, by a wireless device from a network device, information indicative of a first bandwidth for performing narrowband communication, wherein the first bandwidth is less than or equal to a default bandwidth, wherein the default bandwidth is greater than or equal to 5 MHz, and wherein the first bandwidth is determined based on a location of a set of consecutive resource units and a number of resource units of the set of consecutive resource units; and transmitting, by the wireless device, a message in the first bandwidth;

wherein the set of consecutive resource units is included in a control resource set for a Type0 Physical Downlink Control Channel Common Search Space (CORESET 0) bandwidth or a Synchronization Signal Block (SSB) bandwidth; and wherein at least a portion of the CORESET 0 bandwidth or at least a portion the SSB bandwidth is punctured, and wherein the set of consecutive resource units corresponds to frequency resources of the CORESET 0 bandwidth that are not punctured.

5. The method of claim 4, wherein the set of consecutive resource units are included in a CORESET 0 bandwidth, and wherein the CORESET 0 bandwidth is configured to be smaller than the default bandwidth.

6. The method of claim 4, wherein the information indicative of the first bandwidth is carried by a master information block (MIB) or radio resource control (RRC) signaling, and wherein the information indicative of the first bandwidth includes at least one of:

a location of a starting resource unit of the set of consecutive resource units, a location of an ending resource unit of the set of consecutive resource units, the number of resource units, an index corresponding to the location of the starting resource unit and the number of resource units, or an index corresponding to the location of the starting resource unit and the location of the ending resource unit.

7. An apparatus for wireless communication comprising processor electronics and a memory storing instructions, execution of which by the processor electronics causes the apparatus to:

determine a first bandwidth for a wireless device to perform narrowband communication, wherein the first bandwidth is less than or equal to a default bandwidth, wherein the default bandwidth is greater than or equal to 5 MHz, and wherein the first bandwidth is determined based on a location of a set of consecutive resource units and a number of resource units of the set of consecutive resource units; and transmit information indicative of the first bandwidth;

wherein the set of consecutive resource units is included in a control resource set for a Type0 Physical Downlink Control Channel Common Search Space (CORESET 0) bandwidth or a Synchronization Signal Block (SSB) bandwidth; and wherein at least a portion of the CORESET 0 bandwidth or at least a portion the SSB bandwidth is punctured, and wherein the set of consecutive resource units corresponds to frequency resources of the CORESET 0 bandwidth that are not punctured.

8. The apparatus of claim 7, further caused to:

configure a CORESET 0 bandwidth to be smaller than the default bandwidth, wherein the set of consecutive resource units are included in the CORESET 0 bandwidth.

9. The apparatus of claim 7, wherein the information indicative of the first bandwidth is carried by a master information block (MIB) or radio resource control (RRC) signaling, and wherein the information indicative of the first bandwidth includes at least one of:

a location of a starting resource unit of the set of consecutive resource units, a location of an ending resource unit of the set of consecutive resource units, the number of resource units, an index corresponding to the location of the starting resource unit and the number of resource units, or an index corresponding to the location of the starting resource unit and the location of the ending resource unit.

10. An apparatus for wireless communication comprising processor electronics and a memory storing instructions, execution of which by the processor electronics causes the apparatus to:

receive, from a network device, information indicative of a first bandwidth for performing narrowband communication, wherein the first bandwidth is less than or equal to a default bandwidth, wherein the default bandwidth is greater than or equal to 5 MHz, and wherein the first bandwidth is determined based on a location of a set of consecutive resource units and a number of resource units of the set of consecutive resource units; and transmit a message in the first bandwidth;

wherein the set of consecutive resource units is included in a control resource set for a Type0 Physical Downlink Control Channel Common Search Space (CORESET 0) bandwidth or a Synchronization Signal Block (SSB) bandwidth; and wherein at least a portion of the CORESET 0 bandwidth or at least a portion the SSB bandwidth is punctured, and wherein the set of consecutive resource units corresponds to frequency resources of the CORESET 0 bandwidth that are not punctured.

11. The apparatus of claim 10, wherein the set of consecutive resource units are included in a CORESET 0 bandwidth, and wherein the CORESET 0 bandwidth is configured to be smaller than the default bandwidth.

12. The apparatus of claim 10, wherein the information indicative of the first bandwidth is carried by a master information block (MIB) or radio resource control (RRC) signaling, and wherein the information indicative of the first bandwidth includes at least one of:

a location of a starting resource unit of the set of consecutive resource units, a location of an ending resource unit of the set of consecutive resource units, the number of resource units, an index corresponding to the location of the starting resource unit and the number of resource units, or an index corresponding to the location of the starting resource unit and the location of the ending resource unit.

\* \* \* \* \*